(12) United States Patent
Koike

(10) Patent No.: US 8,210,305 B2
(45) Date of Patent: Jul. 3, 2012

(54) CANISTER RETAINING STRUCTURE AND VEHICLE INCLUDING SAME

(75) Inventor: Munetaka Koike, Shizuoka-ken (JP)

(73) Assignee: Yamaha Hatsudoki Kabushiki Kaisha, Iwata-Shi (JP)

( * ) Notice: Subject to any disclaimer, the term of this patent is extended or adjusted under 35 U.S.C. 154(b) by 304 days.

(21) Appl. No.: 12/706,565

(22) Filed: Feb. 16, 2010

(65) Prior Publication Data

US 2010/0206653 A1    Aug. 19, 2010

(30) Foreign Application Priority Data

Feb. 16, 2009 (JP) ................................ 2009-032536

(51) Int. Cl.
*B62M 11/00* (2006.01)
*F02M 33/02* (2006.01)
(52) U.S. Cl. ........................................................ 180/219
(58) Field of Classification Search ............. 180/219
See application file for complete search history.

(56) References Cited

U.S. PATENT DOCUMENTS

| 2007/0089713 A1* | 4/2007 | Koike et al. ............. 123/509 |
| 2010/0163328 A1* | 7/2010 | Hasegawa ............. 180/225 |
| 2010/0243358 A1* | 9/2010 | Suzuki ............. 180/219 |

FOREIGN PATENT DOCUMENTS

JP    06-305469 A    11/1994

\* cited by examiner

*Primary Examiner* — Kevin Hurley
(74) *Attorney, Agent, or Firm* — Rabin & Berdo, P.C.

(57) ABSTRACT

A motorcycle can include an engine, a fuel tank, a seat, and a canister. The fuel tank can have an upper surface and an inclined surface arranged to extend obliquely downward from a rear end of the upper surface toward a back of the motorcycle. The seat can include a seat front portion and a seat rear portion. The seat front portion can be provided on the inclined surface, and the seat rear portion can extend toward the back of the motorcycle. The canister can be arranged between the inclined surface and the seat front portion. The canister can store fuel gas generated in the fuel tank, and supply the fuel gas to the engine. At least one of the inclined surface and the lower surface can have a first cavity that stores the canister.

10 Claims, 11 Drawing Sheets

120
CANISTER RETAINING STRUCTURE AND VEHICLE INCLUDING SAME

CROSS-REFERENCE TO RELATED APPLICATIONS

This application claims priority under 35 U.S.C. §119 from Japanese Patent Application No. JP 2009-032536, filed Feb. 16, 2009, the entirety of which is incorporated herein by reference.

BACKGROUND OF THE INVENTION

1. Field of the Invention

Embodiments of the present invention relate to a vehicle, such as a motorcycle, that includes a canister.

2. Description of the Related Art

A canister is connected to a fuel tank and an engine. When the engine is in a stopped state, fuel gas generated in the fuel tank is stored in the canister. When the engine starts to operate, the fuel gas in the canister is supplied to the engine.

Japanese Patent No. 3324239 discloses a motorcycle including a canister. According to Japanese Patent No. 3324239, the canister is provided between an engine cylinder and a center frame provided behind the engine cylinder. A carburetor and an air cleaner are provided behind the engine. The canister is attached in an exposed manner at a side surface of the vehicle body to avoid the carburetor and the air cleaner.

SUMMARY OF THE INVENTION

Embodiments of the present invention provide a vehicle, such as a motorcycle, having a canister that is less likely to catch foreign matter.

The motorcycle according to the embodiments can include an engine, a fuel tank, a seat, and a canister. The fuel tank can be provided above the engine. The fuel tank can have an upper surface and an inclined surface arranged to extend obliquely downward from a rear end of the upper surface toward a back of the motorcycle. The seat can include a seat front portion and a seat rear portion. The seat front portion can be provided on the inclined surface of the fuel tank. The seat rear portion can extend from the seat front portion toward the back of the motorcycle. The canister can be provided between the inclined surface of the fuel tank and the seat front portion. The canister can store fuel gas generated in the fuel tank and supply the fuel gas to the engine. The seat front portion can also have a seat lower surface. The seat lower surface can be opposed to the inclined surface of the fuel tank. One of the inclined surface and the seat lower surface can have a first cavity arranged to store the canister.

In the motorcycle according to the embodiments, the canister can be provided between the seat and the fuel tank and stored in the first cavity. Therefore, dust or dirt raised by the tires is unlikely to enter the canister.

A thickness of the seat front portion can increase from a front to the back of the motorcycle. The canister can be provided at a rear part of the inclined surface. The seat lower surface can have the first cavity. In this way, the cavity can be formed in a part of the seat portion having a comparatively large thickness.

The motorcycle can further include a head pipe and a pair of frames. The head pipe can be provided ahead of the fuel tank. The pair of the frames can extend obliquely downward from the head pipe toward the back. The fuel tank can have a lower part disposed, e.g., inserted, between the pair of frames. The inclined surface can have the cavity. In this way, the capacity of the fuel tank can be substantially maintained, or at least, a reduction in its capacity can be minimized.

Embodiments of the invention further relate to a canister retaining structure for a vehicle, such as a motorcycle. The canister retaining structure can comprise a seat portion and a tank portion. At least one of the seat portion or the tank portion can have a recess configured to receive the canister therein. The tank portion can be formed in an upper surface of a fuel tank, and the seat portion can be formed in a lower surface of a seat. In the canister retaining structure, the recess can be formed at least partly in the upper surface of the fuel tank. Further, the recess can be formed at least partly in the lower surface of the seat.

In the canister retaining structure, the recess can be configured to receive a substantially cylindrical canister. Alternatively, the recess can be configured to receive a substantially box-shaped canister. The canister can be received within a space formed by the recess of the at least one of the seat portion or the tank portion when the upper surface of the fuel tank and the lower surface of the seat are brought into opposition.

Other features, elements, steps, characteristics and advantages of the present invention will become more apparent from the following detailed description of preferred embodiments of the present invention with reference to the attached drawings.

DETAILED DESCRIPTION OF THE INVENTION

The invention will now be described in more detail by way of example with reference to the embodiments shown in the accompanying Figures. It should be kept in mind that the following described embodiments are only presented by way of example and should not be construed as limiting the inventive concept to any particular physical configuration. It should further be understood that "exemplary" as used herein means "serving as an example, instance or illustration." Any aspect referred to herein as "exemplary" is not necessarily to be construed as preferred over other aspects.

Further, if used and unless otherwise stated, the terms "upper," "lower," "front," "back," "over," "under," and similar such terms are not to be construed as limiting the invention to a particular orientation. Instead, these terms are used only on a relative basis.

Moreover, any term of degree used herein, such as "substantially," "essentially," "nearly" and "approximately" means a reasonable amount of deviation of the modified word is contemplated such that the end result is not significantly changed. For example, such terms can be construed as allowing a deviation of at least 5% of the modified word if this deviation would not negate the meaning of the word the term of degree modifies.

First Preferred Embodiment

Overall Structure of Motorcycle

Figure 1:
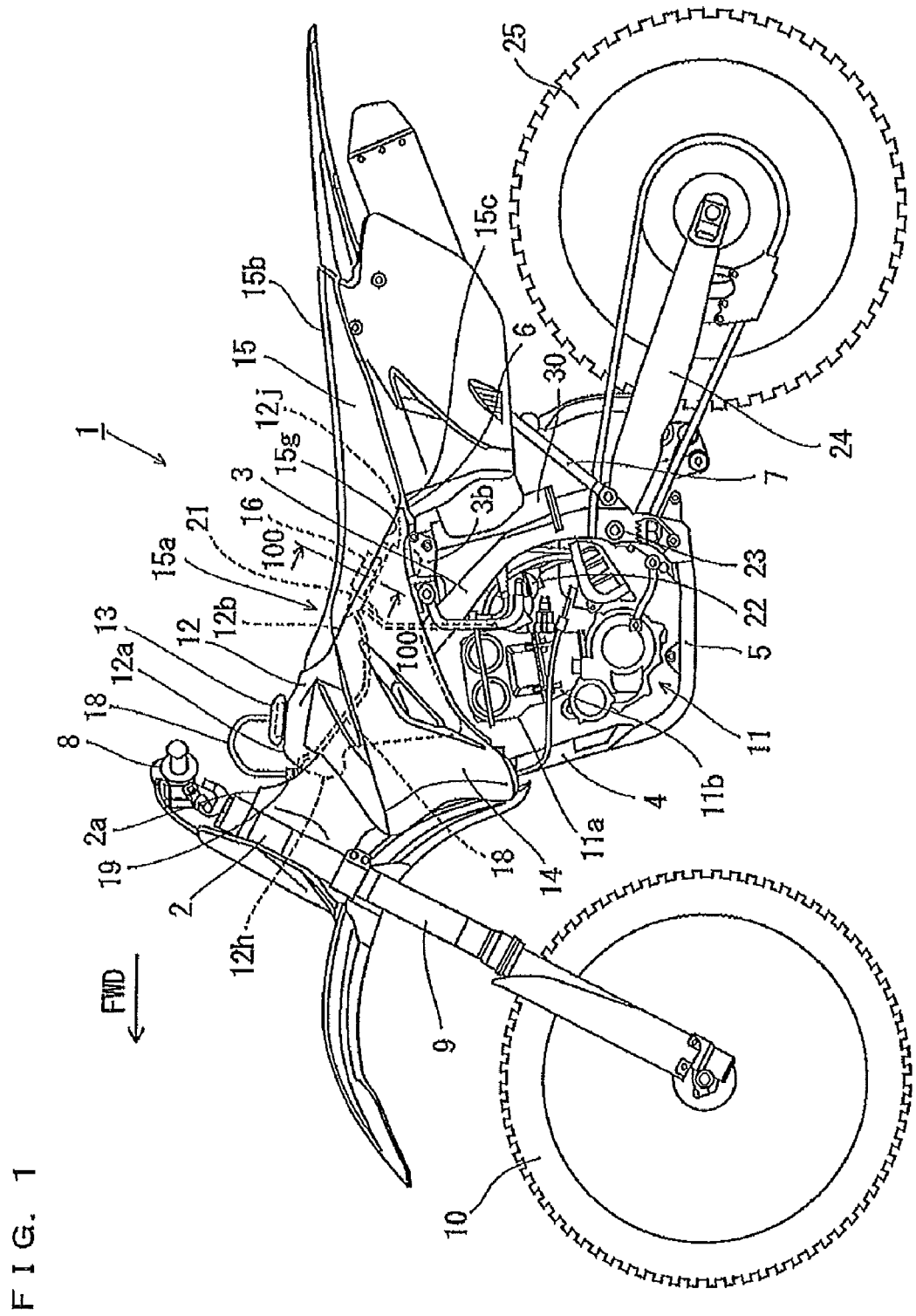
FIG. 1 is a side view of a motorcycle 1 according to a first exemplary embodiment of the present invention.

FIG. 1 is a left side view of a motorcycle 1 according to a first exemplary embodiment of the present invention. The following description includes references to directions, such as "front," "frontward," "ahead," "back," "rear," "rearward," "behind," "right," "left," "above," "below," "up," "upward," "down," "downward," "forward," "backward," "widthwise," "lengthwise," "horizontal" and "vertical." As used herein (if used), these terms reflect the perspective of a person facing in the direction indicated by the arrow labeled "FWD" in the drawings, such as a rider seated on or straddling the motorcycle 1 and facing toward a front wheel 10. Thus, the arrow labeled "FWD" indicates a back-to-front direction relative to the motorcycle 1, or an advancing direction of the motorcycle 1. A direction specified as "left" or "right" in the description refers to left or right with respect to the FWD direction or a direction opposite (e.g. 180 degrees from) to the FWD direction. "Widthwise" corresponds to a direction substantially transverse to the FWD direction or to a direction opposite to the FWD direction, e.g., a left-to-right or right-to-left direction. "Lengthwise" (with respect to the motorcycle 1) corresponds substantially to the FWD direction or to a direction opposite to the FWD direction. "Vertical" refers to a direction substantially transverse to both the widthwise and lengthwise directions, and corresponds substantially to "upward" and/or "downward." "Horizontal" refers to a direction substantially transverse to the vertical direction, and corresponds substantially to the FWD direction or to a direction opposite to the FWD direction.

The motorcycle 1 can be an off-road motorcycle, such as a dual purpose or enduro motorcycle, a motocrosser, or a trialer. The motorcycle 1 can be capable of traveling on an unpaved road. The motorcycle 1 can include an engine 11, the front wheel 10, a rear wheel 25, a handle 8, a seat 15, and a fuel tank 12.

Figure 2:
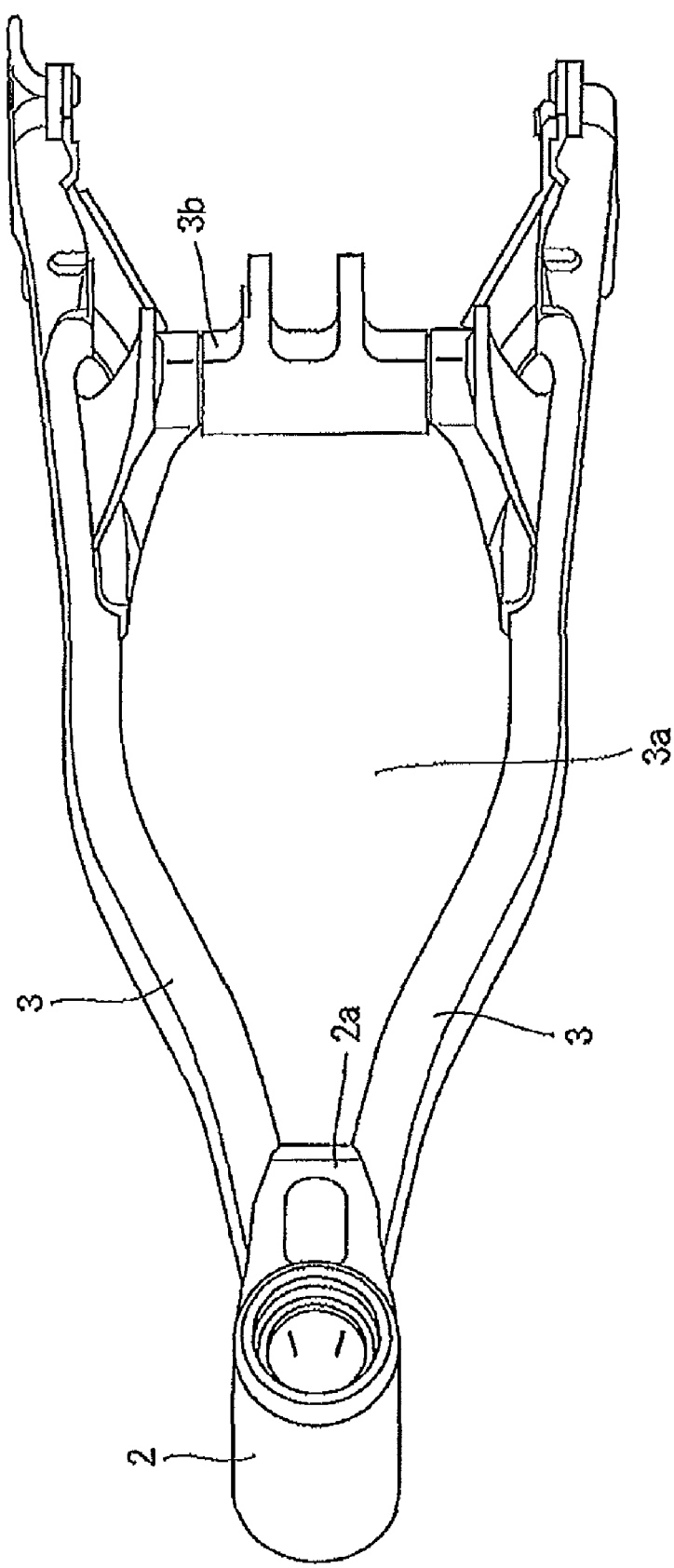
FIG. 2 is a plan view of main frames in FIG. 1.

Main frames 3 can extend obliquely downward from a connection portion 2a toward the back. FIG. 2 is a plan view of the main frames. Referring to FIG. 2, front ends of the pair of main frames 3 can be connected to the connection portion 2a. The connection portion 2a can be attached to a rear part of the head pipe 2. The main frames 3 can extend so as to be spaced apart from each other. Therefore, a gap 3a can exist or be formed between the pair of main frames 3.

Referring back to FIG. 1, the head pipe 2 can be provided in front of the fuel tank 12. A down frame 4 can be provided under the head pipe 2, and can extend downward and slightly backward from the head pipe 2. A lower frame 5 can be provided between a lower end of the down frame 4 and lower ends of the main frames 3. A seat frame 6 can be provided behind the main frames 3, and can extend backward and slightly upward. A backstay 7 can be provided between the main frames 3 and the seat frame 6.

A handle 8 can be provided rotatably at an upper part of the head pipe 2. A pair of front forks 9 can be provided under the head pipe 2. The front wheel 10 can be mounted rotatably at lower ends of the pair of front forks 9. The engine 11 can be provided under the main frames 3 and behind the down frame 4. The engine 11 can include a cylinder head 11a and a cylinder block 11b. The cylinder head 11a can be provided on the cylinder block 11b. A carburetor 22 can be provided between the cylinder head 11a and the main frames 3. The carburetor 22 can be used to mix liquid fuel supplied from the fuel tank 12 with air, for supplying a resulting air/fuel mixture to the engine 11.

The fuel tank 12 can be made, for example, of resin, and can be provided behind the head pipe 2. The fuel tank 12 can store liquid fuel. The fuel tank 12 can be substantially or approximately box-shaped and have an upper surface 12a and an inclined surface 12b. The upper surface 12a can be provided at an upper end of the fuel tank 12. A cap 13 can be attached to the upper surface 12a. The inclined surface 12b can extend obliquely downward from a rear end of the upper surface 12a toward the back of the vehicle body. A lower part of the fuel tank 12 can be disposed, e.g., inserted, between the pair of main frames 3. A pair of side covers 14 can be provided on right and left side surfaces of the fuel tank 12.

The seat 15 can be provided on the inclined surface 12b of the fuel tank 12 and the seat frame 6. The seat 15 can extend from a front end of the inclined surface 12b toward the back. The seat 15 can include a seat front portion 15a and a seat rear portion 15b. The seat front portion 15a is provided on the inclined surface 12b. The seat rear portion 15b can extend from the seat front portion 15a toward the back of the motorcycle 1.

A thickness of the seat front portion 15a can increase from front to back. A thickness of the seat rear portion 15b can decrease from front to back. A rider can be seated on an upper surface of the seat 15. The upper surface of the seat 15 can curve mildly from front to back to present a recessed form in a side view. As previously indicated, the motorcycle 1 can be for off-road traveling, and therefore can travel on a bumpy road. To control the center of gravity of the motorcycle 1 while traveling on a bumpy road, the rider may move back and forth on the seat 15 while driving the motorcycle 1. To accommodate the back-and-forth motion of the rider, the seat 15 can be elongated in the front-to-back direction.

The rider, however, is seated most frequently in a center part of the seat 15. Therefore, the seat 15 can be thickest at the center part of the seat 15, e.g., at a connecting part between the seat front portion 15a and the seat rear portion 15b, or a part where the seat front portion 15a and the seat rear portion 15b meet or join.

When viewed from a side, as for example in FIG. 1, the seat 1 can have a reversed triangular shape. A rear end of the seat front portion 15a can meet or merge or connect with a front end of the seat rear portion 15b, to form a lower end portion 15c. The seat front portion 15a can be provided on the inclined surface 12b. Therefore, a seat lower surface 15g of the seat front portion 15a can be opposed to the inclined surface 12b.

A pivot shaft 23 can be provided behind the main frame 3. A rear arm 24 can by supported around the pivot shaft 23 by a front end of the rear arm 24, so that the rear arm 24 can swing in a vertical direction. The rear wheel 25 can be attached rotatably at the rear end of the rear arm 24.

A rear shock absorber 30 can be provided between the rear wheel 25 and the engine 11. The rear shock absorber 30 is provided near the center of the motorcycle 1. The rear shock absorber 30 can be heavy, so that when the rear shock absorber 30 is provided near a center part of the motorcycle 1, the center of gravity of the motorcycle 1 can be located near the center part. Therefore, the operability of the motorcycle 1 can be improved. As shown in FIG. 2, a rod-type attachment member 3b that extends in a widthwise direction of the motorcycle 1 can be provided at a rear part of the pair of main frames 3. The attachment member 3b can be attached at the pair of main frames 3 so that it can rotate around its own axis. An upper end of the rear shock absorber 30 can be attached to the attachment member 3b.

Referring back to FIG. 1, the motorcycle 1 can further include a canister 16. The canister 16 can be provided on the inclined surface 12b. As described above, the seat front portion 15a can be provided on the inclined surface 12b. Therefore, the canister 16 can be provided between the inclined surface 12b and the seat front portion 15a.

A charge hose 18 can be provided between the canister 16 and the fuel tank 12, and allows the canister 16 and the fuel tank 12 to communicate with each other. The charge hose 18 can run between the fuel tank 12 and the side cover 14, and extend to the canister 16 from the cap 13.

Figure 3:
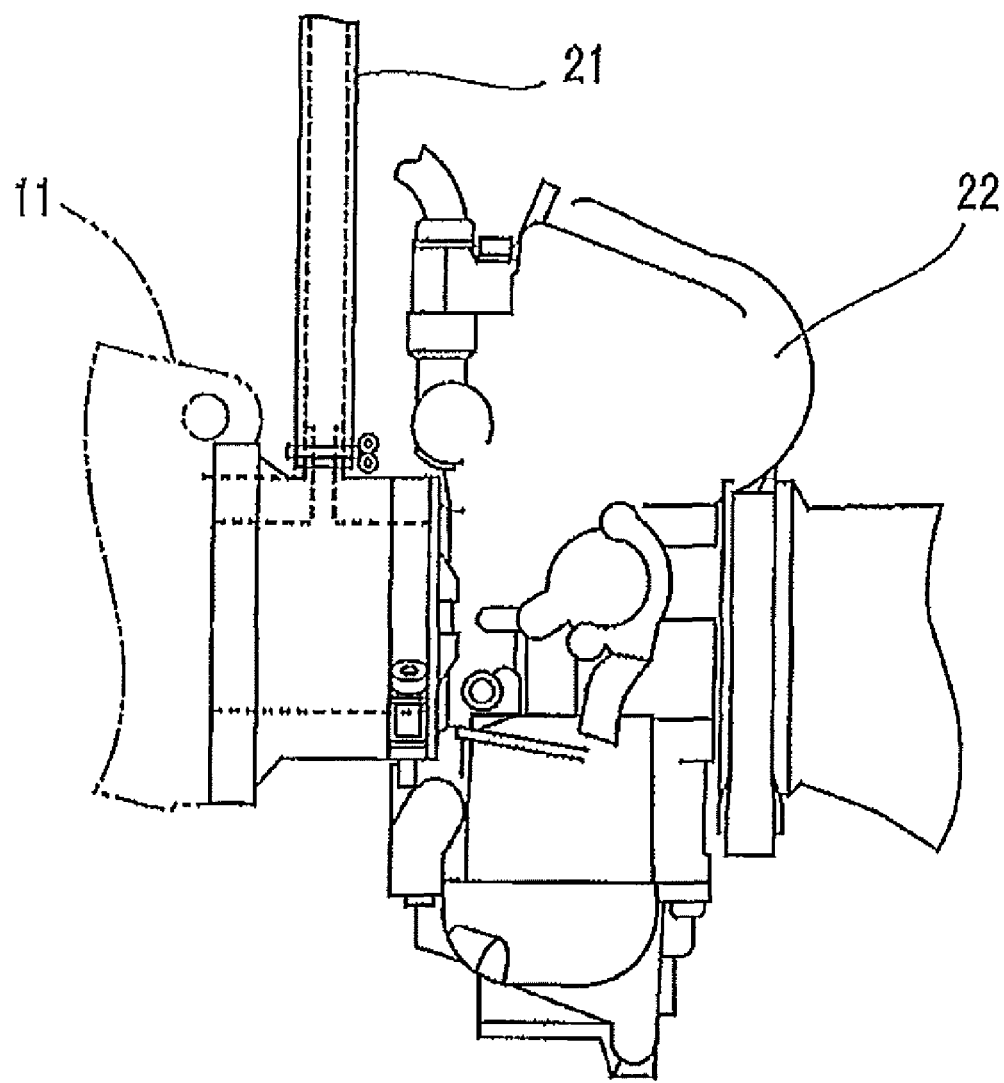
FIG. 3 is a side view of a vicinity of a carburetor in FIG. 1.

A purge hose 21 can be provided between the canister 16 and the carburetor 22, and allow the canister 16 and the carburetor 22 to communicate with each other. The purge hose 21 can run between the fuel tank 12 and the side cover 14, and extend downward from the canister 16. FIG. 3 is an enlarged view of a vicinity of the carburetor 22 in FIG. 1. Referring to FIG. 3, the carburetor 22 can be connected with one end of the purge hose 21. The carburetor 22 and the engine 11 can communicate with/be communicated with each other.

When the engine 11 stops operating, liquid fuel can evaporate in the fuel tank 12, causing fuel gas to be generated. The generated fuel gas can pass through the charge hose 18 and enter the canister 16. The canister 16 can store the fuel gas. When the engine 11 starts operating, a piston can move in the engine 11. The movement of the piston can cause negative pressure in the engine 11 and the carburetor 22. If the inside of the purge hose 21 is under negative pressure, the fuel gas stored in the canister 16 is made to flow into the purge hose 21 and be supplied to the carburetor 22. The fuel gas sent to the carburetor 22 can be mixed with the liquid fuel and air.

Details of Structure of Fuel Tank 12, Canister 16 and Seat 15

Figure 4:
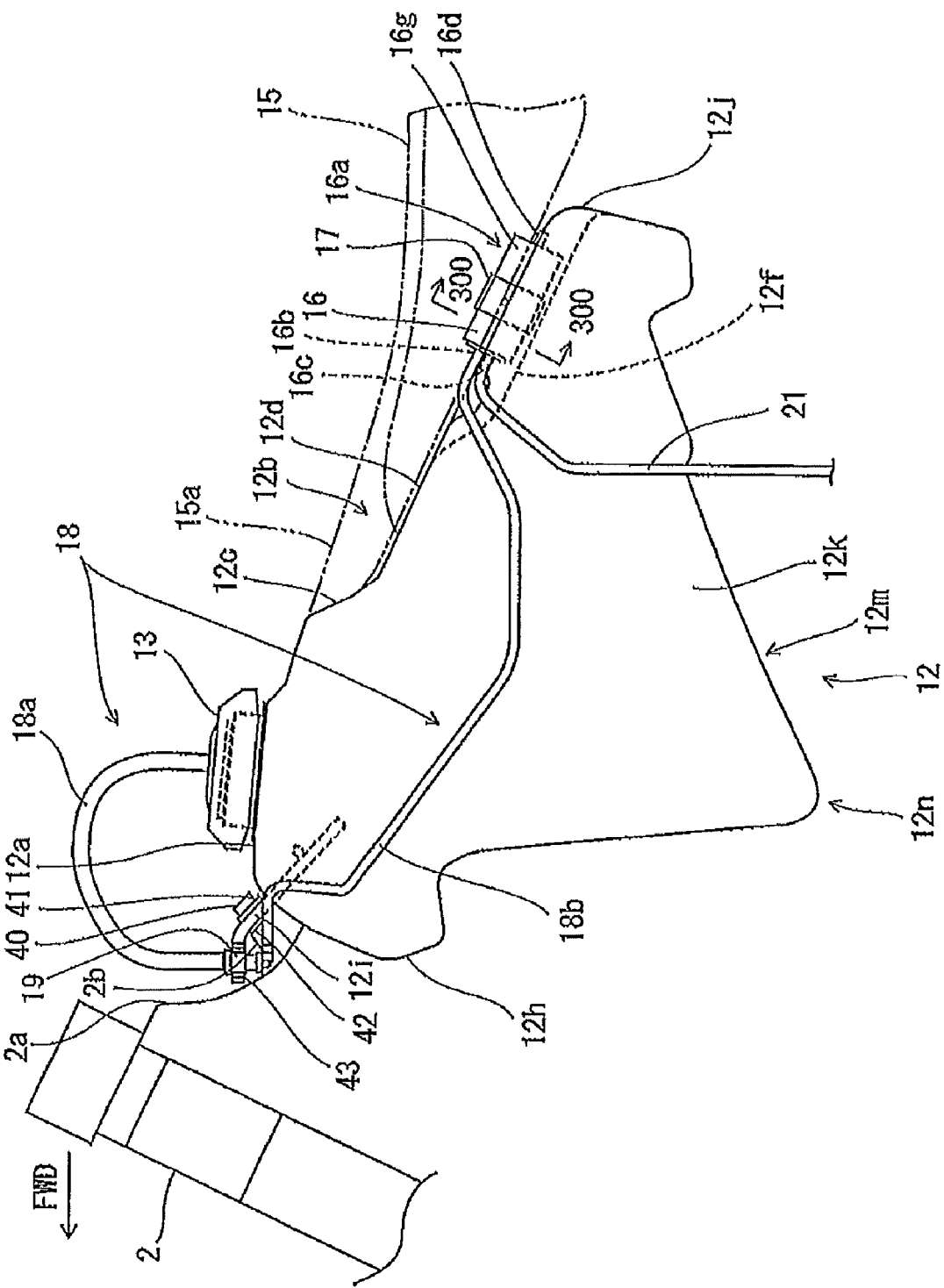
FIG. 4 is a side view of a vicinity of a fuel tank in FIG. 1.
Figure 5:
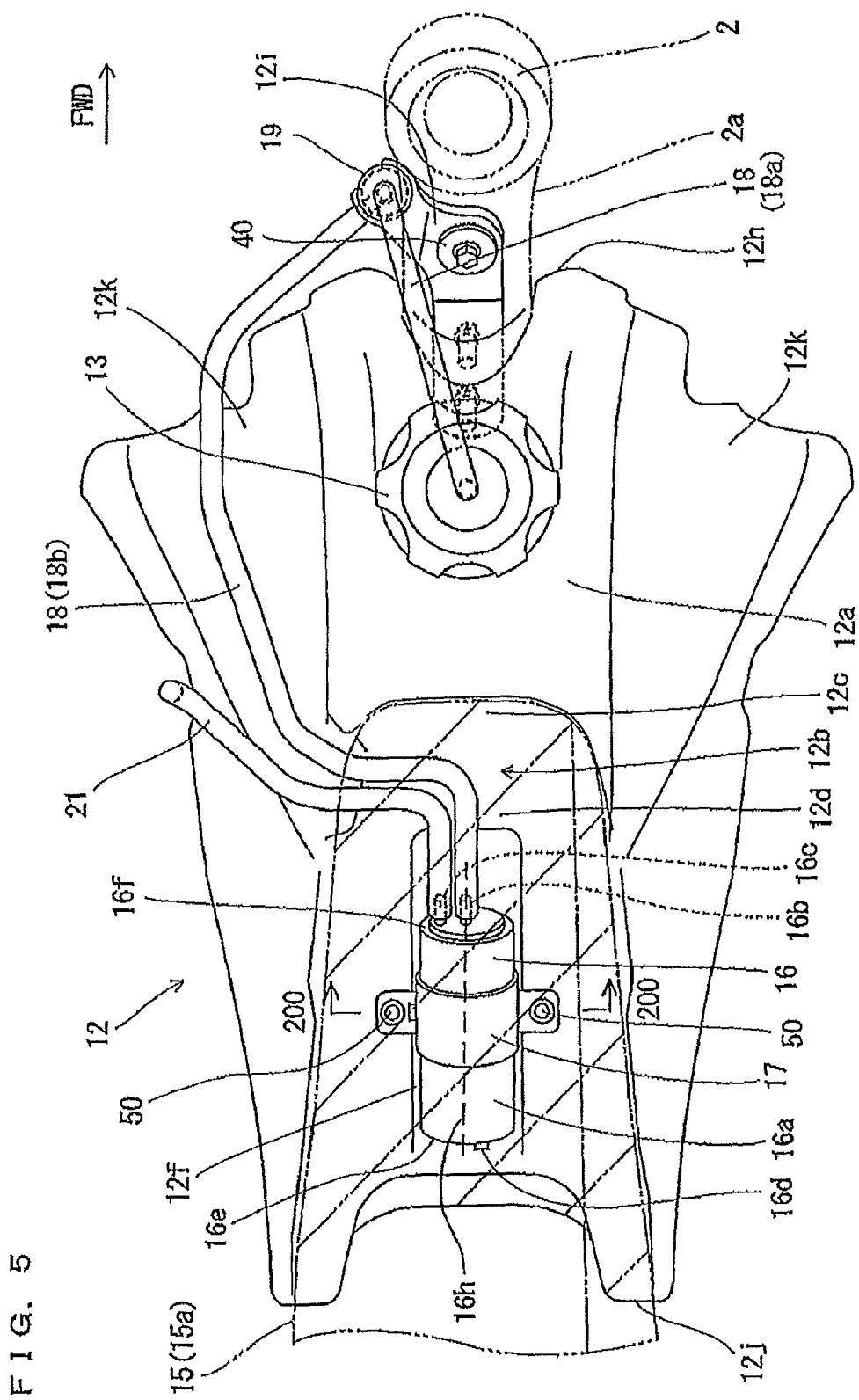
FIG. 5 is a plan view of a vicinity of the fuel tank in FIG. 1.

FIG. 4 is a side view of a vicinity of the fuel tank 12 in FIG. 1. FIG. 5 is a plan view of the vicinity of the fuel tank 12 in FIG. 1. Referring to FIGS. 4 and 5, the canister 16 can be stored in a cavity 12f formed at a rear part of the inclined surface 12b of the fuel tank 12. The canister 16 can be covered with the seat 15. Hereinafter, the structure of the fuel tank 12, the canister 16, and the seat 15 will be described in detail.

Structure of Fuel Tank 12

Referring to FIGS. 4 and 5, the fuel tank 12 can be approximately or substantially box-shaped, and have an upper surface 12a, an inclined surface 12b, a pair of side surfaces 12k, a front end surface 12h, a rear end surface 12j, and a bottom surface 12m. The upper surface 12a can be provided at the upper end of the fuel tank 12, and have an opening formed therein. The opening can be closed by the cap 13. To supply fuel to the fuel tank 12, the cap 13 can be removed and the fuel supplied to the fuel tank via the opening.

The inclined surface 12b can have a front end portion 12c and a flat portion 12d. The flat portion 12d can extend obliquely downward toward the back. The front end portion 12c can curve upward and meet or join or be connected with a rear end of the upper surface 12a.

The inclined surface 12b also has the cavity 12f formed at the flat portion 12d. The cavity 12f can be provided in a center part of the rear part of the inclined surface 12b. The bottom of the cavity 12f can be substantially flat, extend in the front-to-back direction of the motorcycle 1, and have a substantially rectangular form. A width of the cavity 12f can be larger than a width of the canister 16, in order for the canister 16 to be stored in the cavity 12f. As described previously, the seat front portion 15a can be provided on the inclined surface 12b.

Referring to FIG. 4, the front end surface 12h can be a stepped surface and extend downward from the upper end of the fuel tank 12. An upper end of the front end surface 12h can meet or join or be connected with the front end of the upper surface 12a. A lower end of the front end surface 12h can meet or join or be connected with a front end of the bottom surface 12m and form a lower end 12n. The bottom surface 12m can be a stepped surface and correspond to a bottom of the fuel tank 12.

An upper end of the rear end surface 12j can meet or join or be connected with the rear end of the inclined surface 12b, and a lower end of the rear end surface 12j can meet or join or be connected with a rear end of the bottom surface 12m. Upper ends of the pair of side surfaces 12k can meet or join or be connected with side edges of the upper surface 12a and the inclined surface 12b, and lower ends of the side surfaces 12k can meet or join or be connected with side edges of the bottom surface 12m. Front ends of the side surfaces 12k can meet or join or be connected with side edges of the front end surface 12h, and rear ends of the side surfaces 12k can meet or join or be connected with side edges of the rear end surface 12j.

Although not shown in FIG. 4, a lower part of the fuel tank 12 can be disposed between the pair of main frames 3. The lower end 12n of the fuel tank 12 can be provided near the cylinder head 11a of the engine 11.

Referring to FIGS. 4 and 5, a metal attachment member 12i can be provided between the head pipe 2 and the fuel tank 12. The attachment member 12i can be used to attach the fuel tank 12 to the head pipe 2. The attachment member 12i can have a plate shape, and extend obliquely downward toward the back of the motorcycle 1. A front part of the fuel tank 12 can be attached at a lower end portion of the attachment member 12i. As shown in FIG. 4, the connection portion 2a can have a boss 2b at an upper end thereof. An upper end portion of the attachment member 12i can be attached to the boss 2b by a fastener such as a bolt 40. A damper 41 formed from a flexible or deformable material such as rubber, for example, can be held between the attachment member 12i and the bolt 40, and a damper 42 made, for example, of rubber, can held between the attachment member 12i and the boss 2b. While the motorcycle 1 travels, the dampers 41 and 42 can reduce vibration transmitted to the fuel tank 12.

Structure of Canister 16

Figure 6:
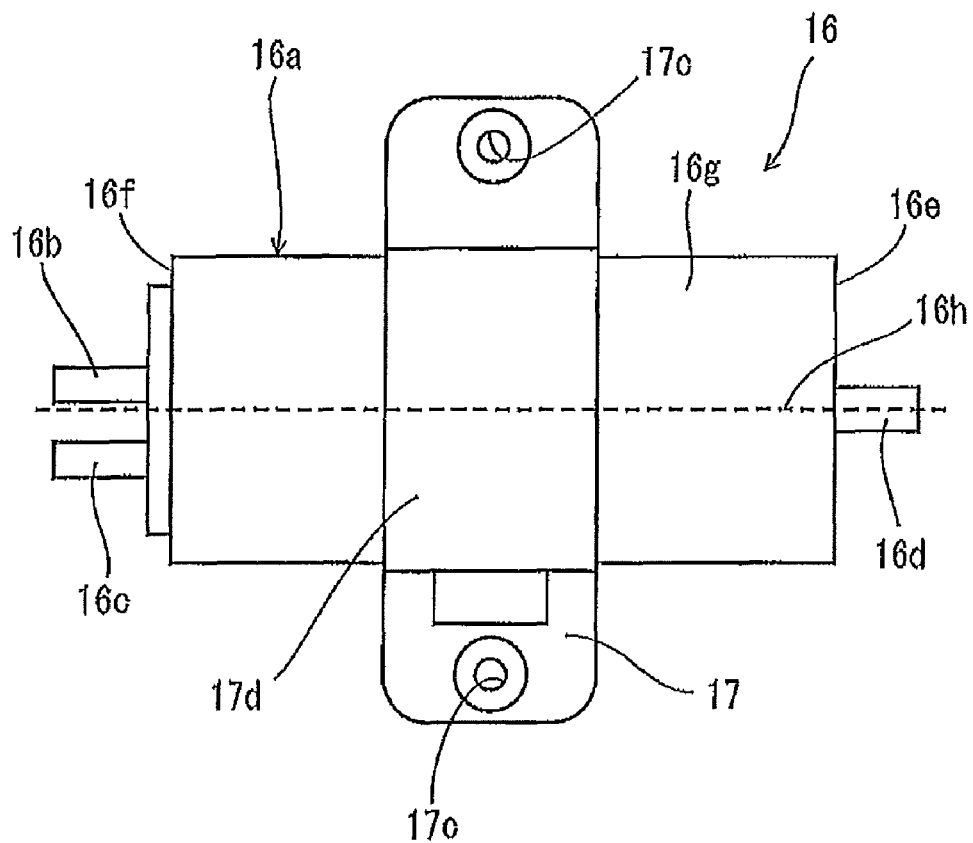
FIG. 6 is a plan view of a canister and an attachment member in FIG. 5.

FIG. 6 is a plan view of the canister 16. Referring to FIG. 6, in a plan view the canister 16 can be substantially rectangular or box-shaped, with a longitudinal axis 16h. As seen in other views, for example, as seen in perspective as in FIG. 5 or in cross section as in FIG. 7 or 8, the canister 16 can have a substantially cylindrical shape. The canister 16 can include a main body case 16a, a charge port 16b, a purge port 16c, and a release port 16d. The main body case 16a can be substantially or approximately tubular and have a cylindrical side surface 16g, an end surface 16e, and an end surface 16f.

The main body case 16a can store an adsorbent such as activated carbon particles. The charge port 16b can be provided so as to be substantially perpendicular to the end surface 16f. The charge port 16b can be substantially or approximately tubular and penetrate or extend through the end surface 16f. The purge port 16c can be provided so as to be upright proximately to, e.g., next to the charge port 16b on the end surface 16f. The purge port 16c can be substantially or approximately tubular and penetrate or extend through the end surface 16f. The release port 16d can be provided so as to be substantially upright on the end surface 16e. More specifically, the release port 16d can be provided on an opposite side to the charge port 16b and the purge port 16c. The release port 16d can be substantially or approximately tubular and penetrate or extend through the end surface 16f.

When the engine 11 is in a stopped state, fuel gas generated in the fuel tank 12 can come into the main body case 16a from the charge port 16b together with air in the fuel tank 12. The fuel gas can be adsorbed by the adsorbent in the main case 16a. The air coming from the fuel tank 12 can pass the adsorbent and be discharged to the outside from the release port 16c. When the engine 11 is in operation, the purge hose 21 can be under negative pressure. Therefore, the main body 16a can be under negative pressure through the purge port 16c. The fuel gas adsorbed by the adsorbent departs from the adsorbent under negative pressure can pass through the purge port 16c and come into the carburetor 22 and the engine 11. At this time, the inside of the main body case 16a can be under negative pressure and therefore air can come into the main body case 16a from the outside through the release port 16d.

Arrangement of Canister 16

Referring back to FIGS. 4 and 5, the canister 16 can be laid substantially flat in the cavity 12f. More specifically, the canister 16 can be provided to have the side surface 16g opposed to a wall of the cavity 12f. Referring to FIG. 5, the longitudinal axis 16h of the canister 16 can extend along the front-to-back direction of the motorcycle 1 when seen in a plan view. Therefore, the canister 16 can be arranged so as to not extend beyond the inclined surface 12b.

The end surface 16f can be disposed in a forward direction and obliquely upward. Therefore, tip ends of the charge port 16b and the purge port 16c are both can be disposed in a forward direction and obliquely upward. On the other hand, the end surface 16e can be directed in a backward direction and obliquely downward. Therefore, the tip end of the release port 16d can be disposed in a backward direction and obliquely downward. The charge port 16b can be disposed, e.g., inserted, in the charge hose 18 and the purge port 16c can be disposed, e.g., inserted, in the purge hose 21.

Figure 7:
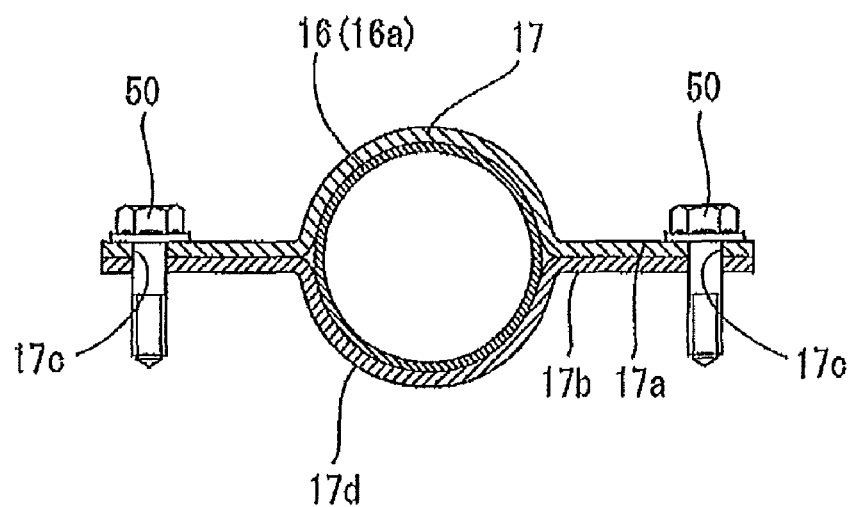
FIG. 7 is a sectional view taken along line 200 in FIG. 5.

Referring to FIG. 5, the canister 16 can be fixed on the inclined surface 12b by an attachment member 17. FIG. 7 is a sectional view of the canister 16 and the attachment member 17 taken along line 200 in FIG. 5. Referring to FIG. 7, the attachment member 17 can include an upper attachment member 17a and a lower attachment member 17b. The lower attachment member 17b can include a curved portion 17d. The upper attachment member 17a and the lower attachment member 17b can each include a substantially semi-cylindrical holder and a pair of flange members. The flange members can be connected to side edges of the holders. As shown in FIG. 7, the main body case 16a can be held between the holders of the upper and lower attachment members 17a and 17b. The flange member of the upper attachment member 17a can overlap the flange member of the lower attachment member 17b.

Figure 8:
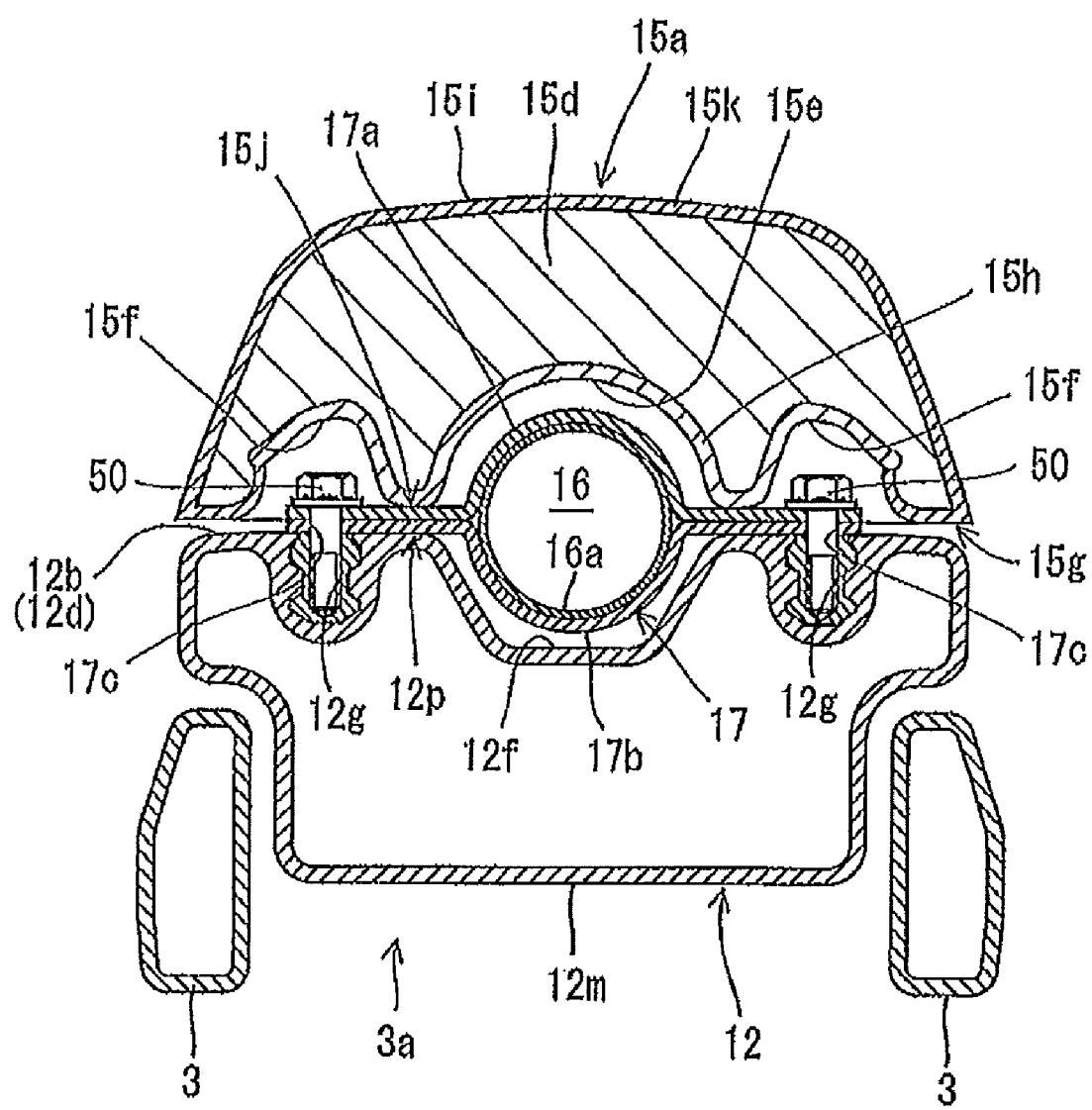
FIG. 8 is a sectional view taken along line 100 in FIG. 1.

FIG. 8 is a sectional view taken along line 100 in FIG. 1. Referring to FIG. 8, the attachment member 17 can be attached to the flat portion 12d. The pair of the flange members of the upper and lower flange members 17a and 17b can each have a through hole 17c. A part of the flat portion 12d in contact with the flange member of the lower attachment member 17b can have a pair of holes 12g, e.g., to receive a fastener such as a screw. A hole 12g can be, for example, a metal insert nut, provided in the fuel tank 12 by insert molding. The attachment member 17 can be fixed to the flat portion 12d by a pair of fasteners 50, e.g., bolts, inserted in the through holes 17c and the screw holes 12g. Therefore, the canister 16 can be attached to the fuel tank 12d.

Referring to FIG. 1, the canister 16 can be provided at the rear part of the inclined surface 12b, and a lower end of the canister 16 can be provided ahead of and above the upper end of the rear shock absorber 30. The canister 16 can be provided substantially in a center part of the motorcycle. Therefore, the center of gravity of the motorcycle 1 can be approximately located in a center part of the motorcycle 1, which can improve the operability of the motorcycle 1.

Structure of Seat 15

Referring to FIGS. 4 and 5, the seat front portion 15a can be provided on the inclined surface 12b. Therefore, the seat front portion 15a can cover the canister 16.

Referring to FIG. 8, the seat 15 can include a surface skin 15k, a cushion member 15d, and a bottom plate 15h. The cushion member 15d can be made of a well-known material. The surface skin 15k can made of a well-known material, and cover the cushion member 15d. The bottom plate 15h can be made, for example, of resin, and formed to have a prescribed shape. The bottom plate 15h can extend along an entire length of the seat 15.

The seat front portion 15a can have a seat upper surface 15i on which a rider is seated and a seat lower surface 15g on an opposite side to the seat upper surface 15i. The seat lower surface 15g can be opposed to the inclined surface 12b. The seat lower surface 15g can include the surface skin 15k and the bottom surface 15h.

The seat lower surface 15g can have formed therein a cavity 15e. The cavity 15e can have a substantially semi-cylindrical shape corresponding to the shape of the canister 16. The cavity 15e can be opposed to the cavity 12f, and extend in a front-to-back direction of the motorcycle 1, similarly to the cavity 12f. Therefore, the canister 16 can be stored in the cavities 12f and 15e.

As described in the foregoing, the canister 16 can be provided between the fuel tank 12 and the seat front portion 15a and stored in the cavities 12f and 15e. When the motorcycle 1 travels on an unpaved bumpy road, the front wheel 10 and the rear wheel 25 can raise dust or dirt from the ground as they rotate. If the canister 16 is attached to the vehicle body in an exposed manner, the raised dust or dirt can enter the canister 16 through the release port 16d. However, in the motorcycle 1, the canister 16 is not exposed to the outside, but hidden or sheltered in the vehicle body by the inclined surface 12b and the seat lower surface 15g. Therefore, the raised dust or dirt is unlikely to enter the canister 16 through the release port 16d.

Cavities 12f and 15e can be formed to create a space to store, e.g., hide, the canister 16 between the fuel tank 12 and the seat 15. Because a cavity may be formed at the lower surface 15g in order to form the space, the volume of the cushion member 15d may be reduced, as compared to the case when such a cavity is not formed. Reduction in the volume of the cushion member 15d may negatively affect riding comfort. Similarly, because a cavity may be formed at the inclined surface 12b, the amount of liquid fuel that can be stored by the fuel tank 12 may be reduced.

Therefore, in the motorcycle 1 according to the first exemplary embodiment, an approach can be implemented to reduce any effect on the riding comfort, and any reduction in the amount of liquid fuel. More specifically, the motorcycle 1 can be structured so as not to have a single frame that extends from the head pipe 2 toward the back. Instead, as shown in FIGS. 2 and 8, the motorcycle 1 can be structured with a pair of main frames 3 that branch from the head pipe 2 and extend toward the back. Due at least in part to such a structure, as shown in FIG. 8, the lower part of the fuel tank 12 can be inserted in the gap 3a (see FIG. 2) formed between the main frames 3. Therefore, the capacity of the tank 12 can be increased as compared to the case of using a conventional single frame. Any reduction in the capacity of the fuel tank 12 due to the cavity 12f can be cancelled by the increase in the capacity of the fuel tank 12 generated by using the gap 3a between the pair of main frames 3. Therefore, the reduction in the capacity of the fuel tank 12 generated by forming the cavity 12f can be reduced.

The cavity 12f can be formed at the rear part of the inclined surface 12b. As described above, the thickness of the seat front portion 15a can increase in a rearward direction. The rear part of the inclined surface 12b can correspond to a rear part of the seat front portion. Therefore, the cavity 15e at the seat lower surface 15g can be formed at a part of the seat front portion 15a having a comparatively large thickness. Since the cavity 15e is formed at a thick part of the seat 15, riding comfort can be less influenced than would be the case if the cavity 15e were formed at a thinner part.

Referring to FIG. 8, the seat lower surface 15g can further have formed therein a pair of cavities 15f corresponding to the fasteners 50. In this way, the fasteners 50 can be kept from abutting against the seat lower surface 15g.

Figure 9:
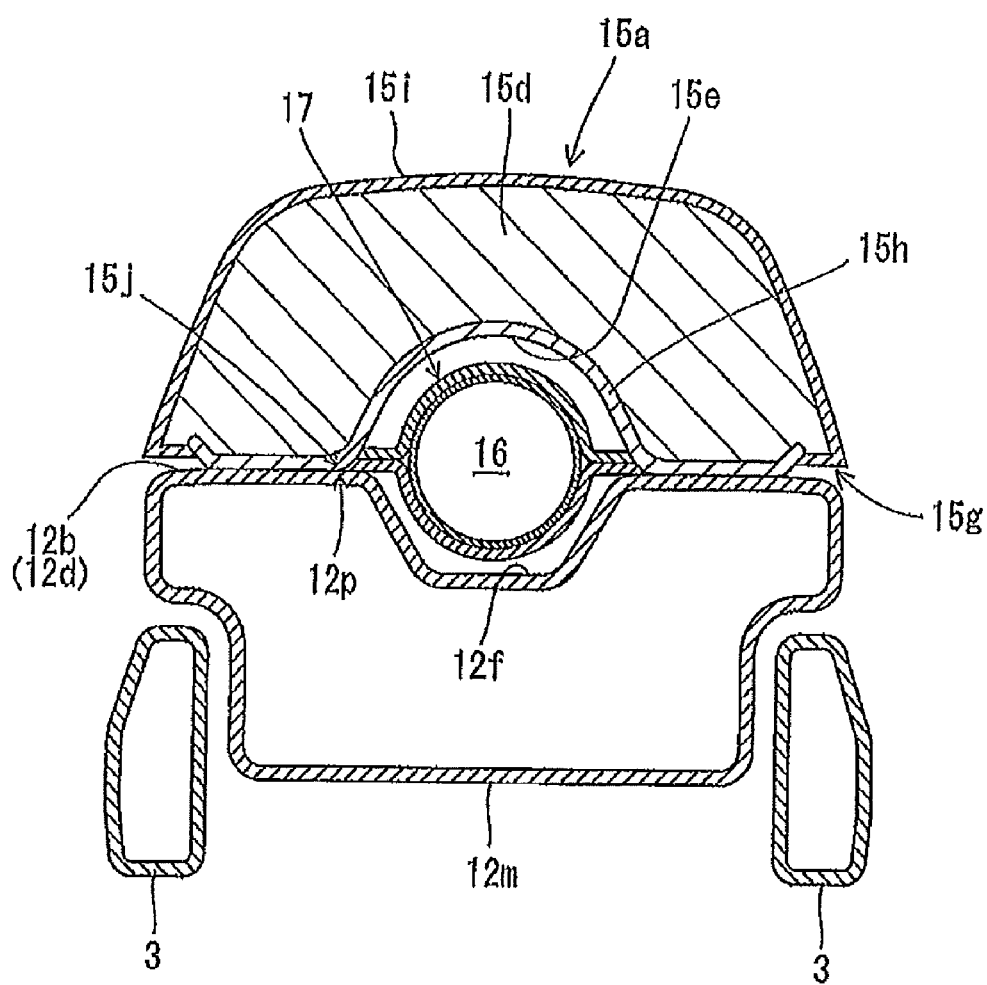
FIG. 9 is a sectional view taken along line 300 in FIG. 4.

An edge 15j of the cavity 15e can be in contact with the flange member of the attachment member 17 at the seat lower surface 15g. FIG. 9 is a sectional view taken line 300 in FIG. 4. Referring to FIG. 9, the edge 15j of the cavity 15e can be in contact with an edge 12p of the cavity 12f. The edge 15j can be in contact with the edge 12p and the attachment member 17, so that the cavity 15e has increased strength. Therefore, when a load is applied from above, the cavity 15e can be prevented from being bent and contacting the canister 16 and the attachment member 17.

Structure of Vicinity of Cap 13

Referring to FIGS. 4 and 5, the charge hose 18 can have one end attached to the cap 13 and the other end attached to the charge port 16b of the canister 16. The fuel tank 12 and the canister 16 can be in communication through the charge hose 18.

The charge hose 18 can be provided with a fuel shut-off valve 19. More specifically, the charge hose 18 includes a first hose 18a and a second hose 18b. The fuel shut-off valve 19 can be arranged between the first and second hoses 18a and 18b. The first hose 18a can be provided between the cap 13 and the fuel shut-off valve 19. The first hose 18a can be curved in a raised arc shape. Therefore, liquid fuel coming into the first hose 18a from the fuel tank 12 is unlikely to reach the fuel shut-off valve 19 and tends to return to the fuel tank 12.

When the motorcycle 1 is inclined (e.g., while rolling) at an angle of a prescribed degree or greater, the fuel shut-off valve 19 can prevent liquid fuel from coming into the canister 16 from the fuel tank 12 through the charge hose 18. The fuel shut-off valve 19 can be, for example, a roll over valve. The fuel shut-off valve 19 can be provided near the front end surface 12h of the fuel tank 12 and above the canister 16. The fuel shut-off valve 19 can be attached to the attachment member 12i through a damper 43 made of, e.g., rubber. Accordingly, a number of components can be reduced as compared to a case of providing members used to attach the fuel shut-off valve 19 separately from the attachment member 12i.

The second hose 18b can be arranged between the fuel shut-off valve 19 and the canister 16. The fuel shut-off valve 19 is arranged more on the side of the fuel tank 12 than a center of the charge hose 18. Additionally, the fuel shut-off valve 19 can be arranged closer to a front end of the fuel tank 12 than a center or center part of the charge hose 18. Stated differently, the second hose 18b can be longer than the first hose 18a. Therefore, if for example liquid fuel is discharged from the fuel shut-off valve 19, the liquid fuel does not easily reach the canister 16.

Second Exemplary Embodiment

According to the first exemplary embodiment described in the foregoing, the recesses 12f and 15e can be formed at the inclined surface 12b and the seat lower surface 15g, respectively, thereby preventing foreign matter from entering the canister.

Figure 10:
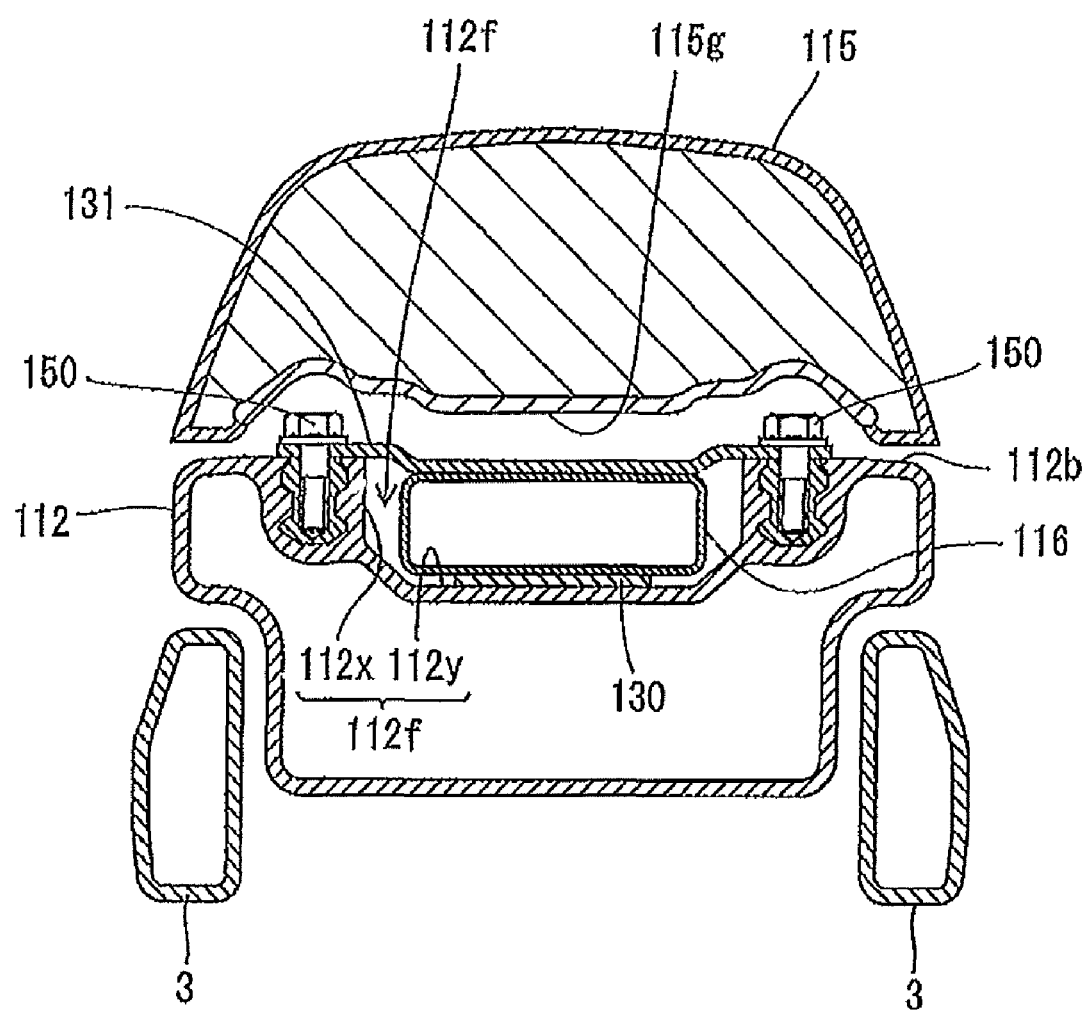
FIG. 10 is a cross-sectional view of a vicinity of a canister according to a second exemplary embodiment of the present invention.

FIG. 10 is a cross sectional view of a vicinity of the canister according to the second exemplary embodiment. The second exemplary embodiment is different from the first exemplary embodiment in that a seat 115 can be provided instead of the seat 15, a fuel tank 112 can be provided instead of the fuel tank 12, and a canister 116 can be provided instead of the canister 16. Other structures of the second exemplary embodiment may be the same as those of the first exemplary embodiment.

The canister 116 can be a substantially or approximately flat rectangular parallelepiped with a substantially or approximately rectangular cross-sectional surface. Thus, the canister 116 can be substantially or approximately box-shaped. The inclined surface 112b of the fuel tank 112 can have a cavity 112f formed therein. The cavity 112f can include a bottom surface 112y and a side surface 112x. The canister 116 can be disposed, e.g., stored, in the cavity 112f. The side surface 112x can have a greater height than the canister 116. Stated differently, a depth of the cavity 112f can be greater than a height of the canister 116.

A substantially plate-shaped elastic member 130 can be provided between the canister 116 and the bottom surface 112y. A substantially plate-shaped attachment member 131 can be provided above the canister 116. The inclined surface 112b have holes, e.g., screw holes, formed therein. The attachment member 131 can be fixed to the inclined surface 112b by fasteners 150, e.g., bolts, inserted into the holes. The canister 116 can be held and fixed between the attachment member 131 and the cavity 112f.

According to the second exemplary embodiment, the cavity 112f can be formed in the fuel tank 112. However, a cavity corresponding to the canister 116 may be absent from the seat lower surface 115g of the seat 115. Therefore, the volume of the cushion member in the seat 115 can be unreduced, so that riding comfort can be maintained.

Furthermore, as shown in FIG. 10, the motorcycle according to the second exemplary embodiment can include a pair of main frames 3. Therefore, any reduction in the capacity of the fuel tank 112 due to the cavity 112f can be reduced.

Third Exemplary Embodiment

Figure 11:
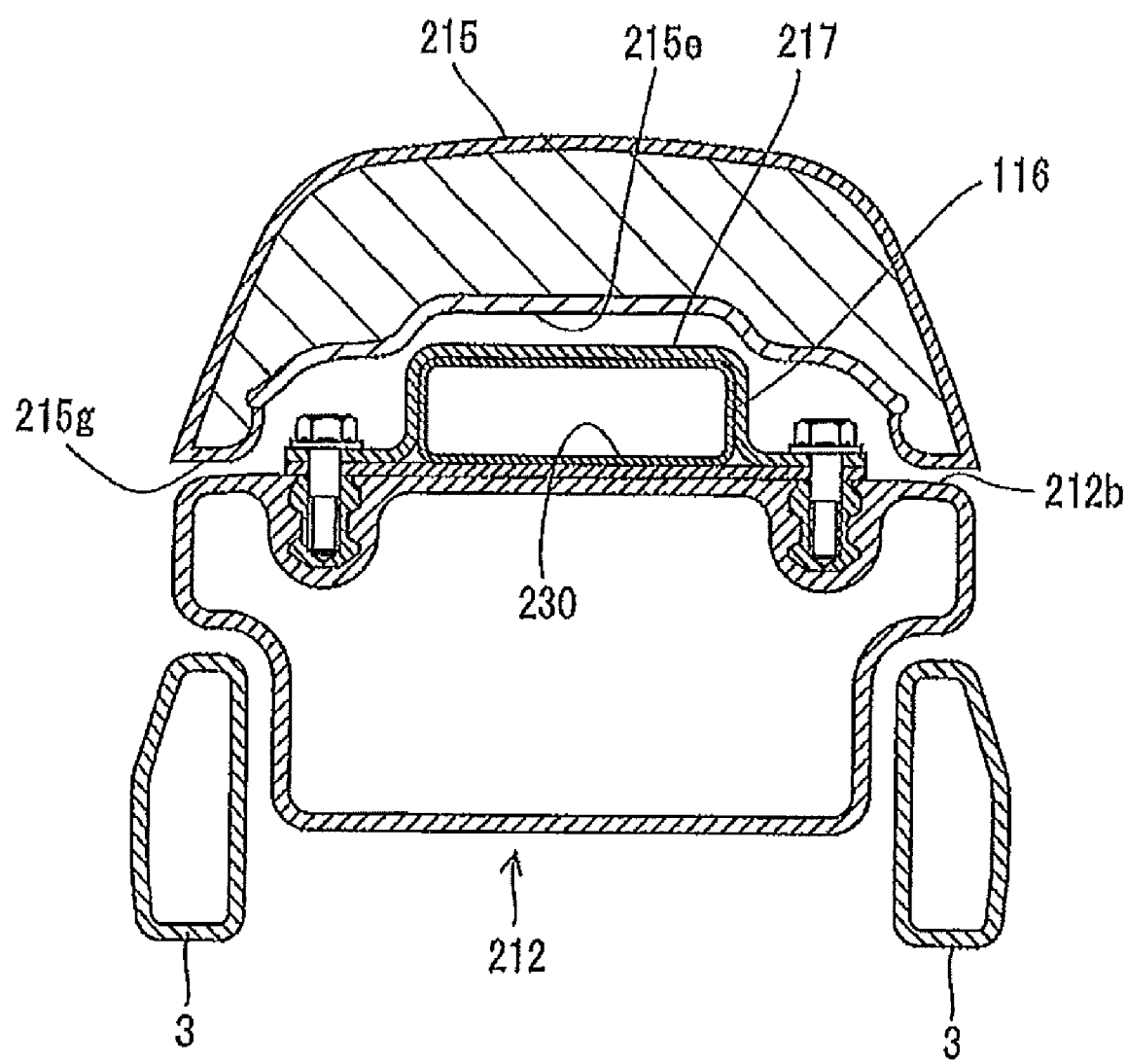
FIG. 11 is a cross-sectional view of a vicinity of a canister according to a third exemplary embodiment of the present invention.

FIG. 11 is a cross-sectional view of a vicinity of a canister according to a third exemplary embodiment of the present invention. A motorcycle according to the third exemplary embodiment is different from the motorcycle according to the second preferred embodiment in that a seat 215 can be provided instead of the seat 115, and a fuel tank 212 can be provided instead of the fuel tank 112. Other structures of the second exemplary embodiment may be the same as those of the second exemplary embodiment.

The inclined surface 212b of the fuel tank 212 can be formed so as to not have a cavity, and thus be substantially flat. The canister 116 can be provided on the inclined surface 212b. A substantially plate-shaped elastic member 230 can be provided between the canister 116 and the inclined surface 212b. An attachment member 217 can be provided above the canister 116. The attachment member 217 and the elastic member 230 can be fixed to the fuel tank 212 by fasteners such as bolts. The canister 116 can be held between the attachment member 217 and the elastic member 230 and attached to the inclined surface 212b.

A seat lower surface 215g of the seat 215 can have formed therein a cavity 215e corresponding to the shape of the canister 116. A depth from the seat lower surface 215g to a bottom of the cavity 215e can be greater than a height of the canister 116. In short, according to the third exemplary embodiment, the canister 116 can be entirely covered with the seat 215. In this way, no cavity is formed at the fuel tank 212, and therefore the capacity of the fuel tank 212 can be maintained.

Furthermore, the canister 116 can be provided at a rear part of the inclined surface 212b similarly to the canister 16. Therefore, riding comfort is less influenced by the cavity 215a.

Fourth Exemplary Embodiment

Figure 12:
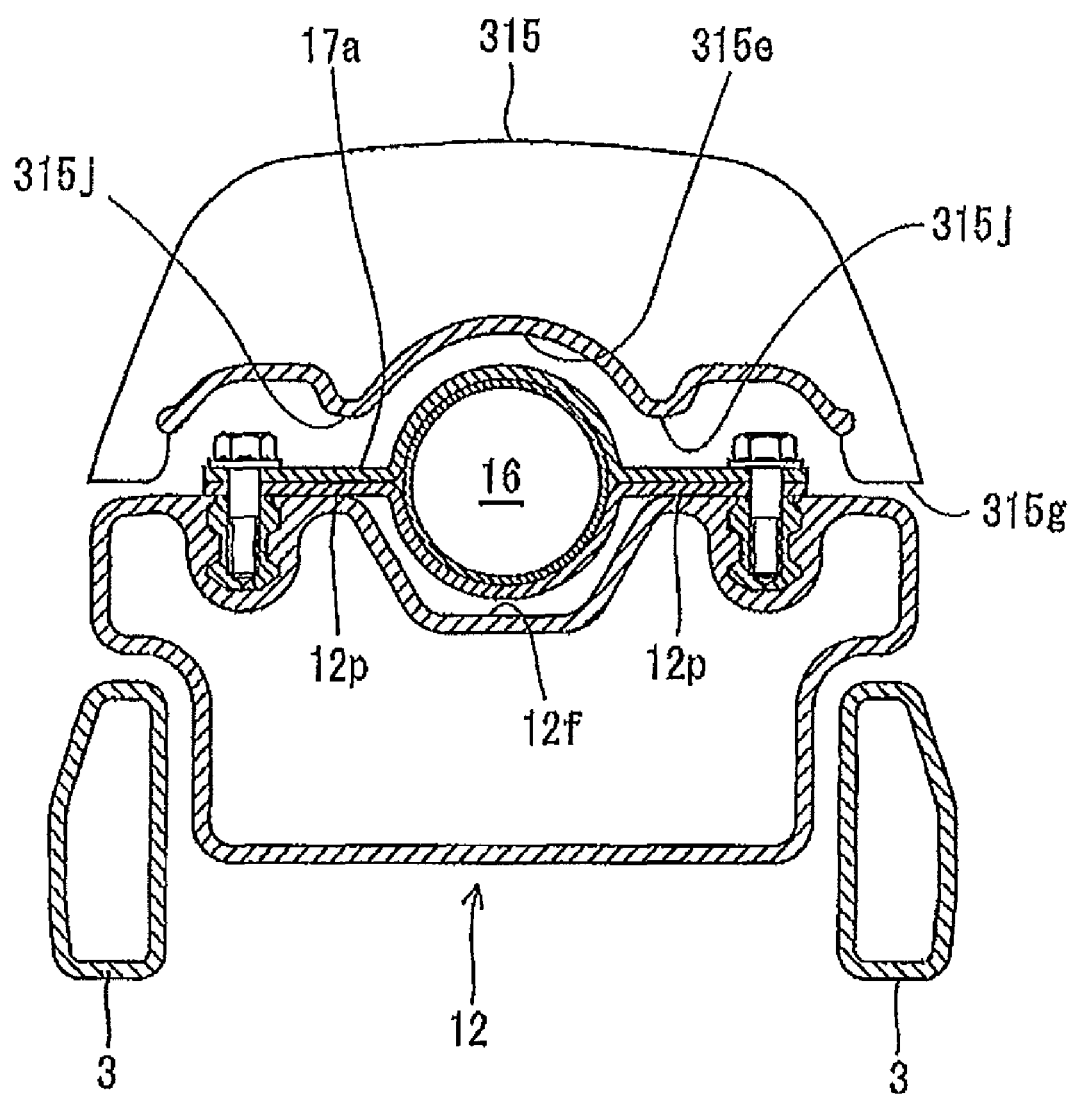
FIG. 12 is a cross sectional view of a vicinity of a canister according to a fourth exemplary embodiment of the invention.

FIG. 12 is a cross sectional view of a vicinity of a canister according to a fourth exemplary embodiment of the present invention. The motorcycle according to the fourth exemplary embodiment is different from the motorcycle according to the first exemplary embodiment in that the motorcycle includes a seat 315 instead of the seat 15. Other structures of the fourth exemplary embodiment may be the same as shown in FIG. 8.

Referring to FIG. 12, the seat 315 can have formed therein a cavity 315e corresponding to the canister 16. An edge 315j of the cavity 315e may, however, may be arranged to as not in to be in contact with, e.g., to be separated from, the attachment member 17. More specifically, a gap can exist or be formed between the edge 315j and the attachment member 17a. Moreover, the edge 315j can be arranged so as not to be in contact with, e.g., to be separated from, the edge 12p of the cavity 12f. Similarly, a gap can exist between an outer part of a seat lower surface 315g of the seat 315 and an outer part of the fuel tank 12.

With the structure described in the foregoing, the cavity 315e may have reduced strength as compared to those in FIGS. 8 and 9. However, because the canister 16 can be stored in the cavities 315e and 12f, dust or dirt is less likely to enter the canister 16.

According to the above-described exemplary embodiments, the canister can be provided at the rear part of the inclined surface of the fuel tank. However, the canister may be arranged at other parts than the rear part of the inclined surface. If one of the inclined surface of the fuel tank and the seat lower surface has a cavity, the canister can be covered, e.g., hidden, by the fuel tank and the seat front portion. Therefore, foreign matter is less likely to enter the canister.

According to the above-described exemplary embodiments, the fuel shut-off valve 19 can be attached to the charge hose 18. However, in embodiments, the motorcycle need not include the fuel shut-off valve 19.

According to the above-described preferred embodiments, the motorcycle includes the carburetor 22. However, the motorcycle according to the present invention may include a different fuel supply device instead of the carburetor 22. An injector that supplies fuel to the engine 11 by electronic control may be used instead of the carburetor. In this case, the purge hose is connected to an intake pipe in the periphery of an injector.

In light of the preceding description, embodiments of the invention can relate to a canister retaining structure for a vehicle, such as a motorcycle 1. The canister retaining structure can comprise a seat portion 15a, 115, 215, 315 and a tank portion 12b, 112b, 212b. At least one of the seat portion 15, 115, 215, 315 or the tank portion 12, 112, 211 can have a recess 15e, 12f, 112f, 215e, 315e configured to receive a canister 16, 116 therein. The tank portion can be formed in an upper surface of a fuel tank 12, and the seat portion can be formed in a lower surface 15g, 115g, 215g, 315g of a seat 15. In the canister retaining structure, the recess can be formed at least partly in the upper surface of the fuel tank. Further, the recess can be formed at least partly in the lower surface of the seat.

In the canister retaining structure, the recess can be configured to receive a substantially cylindrical canister 16. Alternatively, the recess can be configured to receive a substantially box-shaped canister 116. The canister can be received within a space formed by the recess of the at least one of the seat portion or the tank portion when the upper surface of the fuel tank and the lower surface of the seat are brought into opposition.

It will be apparent to one skilled in the art that the manner of making and using the claimed invention has been adequately disclosed in the above-written description of the exemplary embodiments taken together with the drawings. Furthermore, the foregoing description of the embodiments according to the invention is provided for illustration only, and not for limiting the invention as defined by the appended claims and their equivalents.

It will be understood that the above description of the exemplary embodiments of the invention are susceptible to various modifications, changes and adaptations, and the same are intended to be comprehended within the meaning and range of equivalents of the appended claims.

What is claimed is:

1. A motorcycle, comprising:
   an engine;
   a fuel tank provided above the engine and having an upper surface and an inclined surface arranged to extend obliquely downward from a rear end of the upper surface toward a back of the motorcycle;
   a seat comprising a seat front portion provided on the inclined surface and a seat rear portion arranged to extend from the seat front portion toward the back of the motorcycle; and
   a canister provided between the inclined surface and the seat front portion to store fuel gas generated in the fuel tank and supply the fuel gas to the engine,
   the seat front portion having a seat lower surface opposed to the inclined surface, and
   one of the inclined surface and the seat lower surface having a first cavity arranged to store the canister.

2. The motorcycle according to claim 1, wherein a thickness of the seat front portion increases from a front toward the back of the motorcycle,
   the canister is provided at a rear portion of the inclined surface, and
   the seat lower surface has the first cavity.

3. The motorcycle according to claim 1, further comprising:
   a head pipe provided ahead of the fuel tank; and
   a pair of frames arranged to extend obliquely downward from the head pipe toward the back of the motorcycle,
   the fuel tank having a lower portion disposed between the pair of frames, and
   the inclined surface having the first cavity.

4. The motorcycle according to claim 2, further comprising:
   a head pipe provided ahead of the fuel tank; and
   a pair of frames arranged to extend obliquely downward from the head pipe toward the back of the motorcycle,
   the fuel tank having a lower portion disposed between the pair of frames,
   the inclined surface further having a second cavity opposed to the first cavity at the rear portion of the inclined surface,
   the canister being stored in the first and second cavities.

5. The motorcycle according to claim 4, wherein an edge of the first cavity is in contact with an edge of the second cavity.

6. The motorcycle according to claim 1, wherein the canister has a longitudinal axis that extends in a front-to-back direction of the motorcycle when seen in a plan view.

7. The motorcycle according to claim 6, further comprising a shock absorber provided under the seat, a lower end of the canister being arranged ahead of an upper end of the shock absorber.

8. The motorcycle according to claim 1, further comprising:
   a fuel shut-off valve preventing liquid fuel from coming into the canister from the fuel tank when the motorcycle is inclined at a prescribed angle;
   a first hose provided between the fuel tank and the fuel shut-off valve; and
   a second hose being longer than the first hose and provided between the fuel shut-off valve and the canister.

9. The motorcycle according to claim 8, further comprising:
   a head pipe provided ahead of the fuel tank; and
   an attachment member provided between the head pipe and the fuel tank to attach the fuel tank to the head pipe,
   the fuel shut-off valve being attached to the attachment member.

10. The motorcycle according to claim 1, wherein the motorcycle is an off-road motorcycle.

* * * * *